United States Patent [19]

Bosund et al.

[11] 3,978,234

[45] Aug. 31, 1976

[54] PROTEIN COMPOSITION

[75] Inventors: Sven Ingmar Walton Bosund, Halsingborg; Bengt Lennart Bengtsson, Bjuv, both of Sweden

[73] Assignee: Societe d'Assistance Technique pour Produits Nestle S.A., Lausanne, Switzerland

[22] Filed: May 27, 1975

[21] Appl. No.: 580,819

Related U.S. Application Data

[63] Continuation of Ser. No. 362,343, May 21, 1973, abandoned.

[30] Foreign Application Priority Data

May 22, 1972  United Kingdom............... 24005/72

[52] U.S. Cl................................ 426/285; 426/583; 426/588; 426/657
[51] Int. Cl.²................... A23C 11/00; A23C 21/00
[58] Field of Search .......... 426/583, 657, 285, 588; 195/5

[56] References Cited

UNITED STATES PATENTS

| | | | |
|---|---|---|---|
| 2,363,730 | 11/1944 | Hall | 426/583 X |
| 3,798,126 | 3/1974 | Gasser et al. | 195/5 |

*Primary Examiner*—A. Louis Monacell
*Assistant Examiner*—R. A. Yoncoskie
*Attorney, Agent, or Firm*—Watson Leavenworth Kelton & Taggart

[57] ABSTRACT

A protein composition is described, which comprises, on a dry solids by weight basis, 15 to 30% of a fish protein isolate containing at least 90% protein, less than 0.5% of lipids and 1 to 10% of minerals, and having a Nitrogen Solubility Index (NSI) of 80 to 100, and 70 to 85% of whey solids.

12 Claims, No Drawings

PROTEIN COMPOSITION

This is a continuation application of U.S. application Ser. No. 362,343 filed May 21, 1973 and now abandoned.

This invention is concerned with a replacement for skimmed milk.

Numerous attempts have been made to prepare a food product equivalent to skimmed milk. The main reason for this has been the ever increasing price of dairy products. Nearly always the products have been based upon vegetable proteins, such as soy beans, processed according to various methods. Such products are however inferior to skimmed milk as regards flavour, functional properties and nutritional value. In particular, the lower biological value of the protein, which is basically unavoidable when a vegetable raw material is used, is a handicap as such products are intended as replacements for skimmed milk solids in formulated foods to which the skimmed milk solids are added for the primary purposes of conferring desirable functional properties and increasing the nutritional value.

It has now been found that a highly satisfactory replacement for skimmed milk may be prepared from a fish protein isolate having specific characteristics. It has further been found that products having very good functional and nutritional properties are obtained by combining the fish protein isolate with whey solids in certain proportions.

The invention thus provides a protein composition, suitable as a replacement for skimmed milk, comprising, on a dry solids by weight basis, 15 to 30% of a fish protein isolate containing at least 90% protein, less than 0.5% of lipids and 1 to 10% of minerals, and having a Nitrogen Solubility Index (NSI) of 80 to 100, and 70 to 85% of whey solids. The NSI is determined by the American Oil Chemists' Society Official Method Ba 11-65. A particularly preferred composition, by reason of its excellent functional properties, contains 26% fish protein isolate and 74% whey solids.

Protein isolates having the specified properties may be obtained from various fish raw materials, for example by alkali extraction or enzymatic digestion. Particularly preferred are isolates prepared as described in our copending British applications Nos. 23933/72 and 23934/72 of even date herewith.

The first of these applications (British Application 23933/72) provides a process for preparing a protein isolate from fish material, in which a fish material having a lipid content in dry matter not exceeding 0.5% by weight is treated with aqueous alkali at a pH of 10 to 12, at a temperature of 80° to 100°C for a period of time of 1 to 5 minutes, insoluble material is removed from the alkali solution, and thereafter the solution is desalted and deodorised.

The protein isolate obtained by the process of the invention is virtually taste- and odour-free, and has a high nutritional value, at least equal to casein. It is more specifically characterised by having a protein content between 90 and 98%, a lipid content below 0.5% and an ash content between 1 and 10% on dry matter basis.

The starting material for the process is preferably fish solids from which the lipids have been removed to the indicated degree, as for example by extraction with a solvent such as isopropanol. Solvent extraction provides a stable intermediate product, comprising a mixture of fish solids and residual solvents, which is chemically and bacteriologically stable over extended periods of time. This means that the removal of lipids may be carried out at sea and the subsequent processing of the intermediate product on land. Furthermore, the oil obtained directly is of higher quality than oil extracted from fish which has first been treated for example with alkali, and in addition low-molecular, nitrogen-containing substances, of poor nutritional value, are also removed with the solvent.

The fish material may be obtained, for example, from any one of the following:
1. degutted lean fish such as cod, haddock or hake,
2. filleting by-products from frozen fish factories such as V-cuts, which is a part of the fillets normally discarded due to the presence of small bones, and
3. whole fish of pelagic species such as anchovetas, sardines, etc.

The actual method of preparation of the fish starting material is relatively unimportant, provided that it has no more than 0.5% by weight of lipids on a dry matter basis.

Treatment of the fish material with alkali is carried out under controlled conditions of pH, time and temperature so that destruction of the most sensitive amino acids, notably cystein, lysine and methionine is insignificant. Whilst sodium hydroxide is the preferred alkali, as it dissolves the protein rapidly, other alkalis may however be used provided that the positively-charged ions are capable of being removed during the subsequent desalting process described here. The alkali treatment is preferably carried out on a suspension containing 5 to 10% by weight of fish dry matter, and under the conditions herein defined it is possible to dissolve from 80 to 95% of the fish protein without any damage to the nutritional value of the protein. The actual degree of solubilisation will however depend on the fish raw material.

After alkali treatment the suspension may be cooled, for example to 50° to 60°C and insoluble matter, including undissolved protein and solid fractions such as bones removed, e.g. by filtration, pressing or centrifugation. The preferred method is continuous centrifugation, as this may be effected rapidly, resulting in a clear protein solution and in an undissolved bone and protein fraction rich in minerals. Alkali solubilisation as described permits removal of virtually all the bones, so that the fluoride content of the final protein product is very low. This bone protein fraction is preferably dried separately and used as a fodder.

The clarified protein solution is then desalted. Whilst theoretically this operation can be effected by ultrafiltration, it is technically impractical as presently-available membranes are sensitive to high pH values. Electrodialysis is an alternative, but has the disadvantage of giving rise to precipitation, which decreases the capacity of the cells. Ion exchange in columns is the most acceptable principle but this can also give rise to the formation of precipitates when the drop in pH is large, which inhibits the performance of the columns. It is accordingly preferred to carry out the desalting by exchange of the positively-charged ions by ammonium ions, as described and claimed in our copending application No. 13,086/72. The ammonium ions are subsequently completely removed in the steam-stripping.

This application (No. 13,086/72) describes an efficient process for desalting alkaline protein solutions, the term "desalting" being used to designate the removal of cations other than H⁺. The resulting protein products are characterised by a low ash content, generally below 5% in the case of protein isolates. The ash content may however vary with the origin of the protein.

This process for desalting alkaline protein solution comprises exchanging the cations present in the solution for ammonium ions by contacting the solution with a cation exchange resin in ammonium form, and eliminating the ammonium ions from the solution by vaporisation as ammonia. By "vaporisation" is meant that the ammonium ions are eliminated from the solution as ammonia gas, which may be effected, for example, by stripping (with steam or under reduced pressure) or by evaporation.

The cation exchange resin may be either a strongly acidic or weakly acidic resin of the gel type. Macroreticular resins, having a pore size of 30 A or more, are particularly preferred by reason of their long operating life. The resin treatment may be effected at any convenient temperature between 0 and 100°C, the range of 50° to 80°C being preferred, as at these temperatures the viscosity of highly concentrated protein solutions is lower, whilst breakdown of the protein is still insignificant.

In order to eliminate the ammonium ions from the protein solution, a specific vaporisation step is frequently unnecessary if the protein is recovered in dry form. In such cases, after ion exchange treatment the solution is normally concentrated by evaporation at temperatures of 50° to 90°C resulting in volatilisation of ammonia and any residual traces are removed by the heat supplied for drying (e.g. spray-, roller- or vacuum-drying).

For economic reasons it is desirable to recover the ammonia liberated during the heating steps, for example by condensation of the evolved vapours. The resulting aqueous ammonia solution may, after addition of acid to pH 10.0 or lower, be used for regeneration of the ion exchange resin.

The desalting procedure described herein may be applied to alkaline solutions of proteins of various origins, and particularly to fish, vegetable (e.g. soy or other oilseed proteins), microorganism (yeast or bacteria) and milk proteins. The protein content of the solution to be treated may vary within wide limits, the upper limit being generally imposed by the viscosity of the solution. Thus, the dry matter content of untreated protein solutions will normally lie within the limits 2 to 10% by weight, as above 10% the viscosity of the solution impedes satisfactory ion-exchange treatment, and it is usually uneconomic to treat very dilute solutions with protein contents below about 2%. On the other hand, solutions of proteins which have been partially degraded, for example enzymatically, may have a dry matter content of up to about 20% by weight. The pH of the protein solution is preferably in the range 9.5 to 12.5, since at pH values below about 9.5 the efficiency of alkali solubilisation decreases, whilst strongly alkaline conditions are detrimental to the nutritional value of the protein.

In a preferred embodiment of the ion exchange treatment, a strong cation exchange resin, regenerated by an ammonium salt, is used. It is especially favourable to use a macroreticular resin, e.g. Amberlite 200 due to its long life. The concentration of the regenerating salt solution may be from 0.1 to 5.0 N but the preferred concentration is 1.0 N. The temperature of the treated liquid is not critical but it is favourable to use a temperature of 50° to 80°C in order to reduce the viscosity of the protein solution in the column, as the dissolved proteins have the initial high molecular weight of the raw material resulting in a protein solution with high viscosity.

Whilst for certain applications, proteins giving high viscosities in water solutions are required, when a high viscosity is not necessary it is then desirable to reduce the molecular weight of the proteins, particularly by treatment with a proteolytic enzyme, so that the protein solution may be concentrated to a higher dry matter content prior to drying. The enzyme treatment should be mild enough not to change appreciably the properties of the protein other than the viscosity in solution. The enzyme used should preferably have good activity at alkaline pH values, especially in the range 8 to 10. The preferred enzymes are trypsin and bacterial proteases. The amount of enzyme needed is very small, for example 0.1 to 1.0 g per kg of protein dry matter treated. The treatment as stated is very mild, and should desirably be completed within 5 to 30 minutes. Thereafter the residual enzyme is inactivated by heat treatment, e.g. at 60° to 90°C for 5 minutes.

After desalting and enzyme treatment, if this latter is applied, the protein is deodorised, preferably by steam-stripping, in order to remove all undesirable volatiles from the protein solution. These include, as previously stated, ammonium ions, flavour components formed or released in the alkali solubilisation step and any residual solvent from pretreatments such as lipid extraction. The conditions applied are selected having regard to these objectives. The stripping is preferably carried out in a packed column, with the steam entering at the bottom and the protein solution at the top, resulting in a countercurrent contact between the steam and protein solution. In general, from 0.1 to 1.0 kg of steam (at atmospheric pressure) is used per kg of protein solution. The steam leaving the column contains the various volatiles noted above, and may be condensed. The condensate may then be acidified to pH 4.5 and treated for recovery of solvent residues, whereas ammonia and volatile amines remain in the water phase and are discarded.

As the preferred steam-stripping treatment is very effective for the removal of volatiles from the protein solution, additional treatment with absorbents such as active carbon or resin, or with chemical agents such as hydrogen peroxide are generally unnecessary. However, such treatments, if applied, may be carried out before or after the steam-stripping. Hydrogen peroxide is capable of oxidising minor traces of flavour compounds, and also bleaches the protein which may be advantageous when fatty fish with dark flesh is used as a raw material.

After the stripping, the protein may be dried to provide a final product with a moisture content low enough for stability. Prior concentration, as by reverse osmosis, freeze concentration or thermal evaporation is desirable to reduce the load on drying facilities. The method preferred according to the invention is evaporation, and if an enzymatic treatment has been applied, the protein solution may be concentrated to between 25 and 50% dry weight.

Drying may be carried out by a roller, spray- or foam drier or any other conventional drier. The drying is carried out preferably in a spray-drier at relatively low temperatures in order to avoid heat damage to the protein which would be detrimental to the nutritional value and functional properties.

The dried product is light-coloured and bland in flavour and odour. It has a high protein content, between 90 and 98% on dry weight. The product has a high nutritional value and is especially rich in available lysine, ranging from 7.0 to 9.0 g per 16 g N, depending on the raw material. The protein efficiency ratio (PER) is typically in the range 3.0 to 3.5, at least equal to that of casein as determined under identical conditions. The fat content is 0.05 to 0.5% on dry weight and the ash content between 1 and 10%. As the bones were removed prior to alkali dissolution, the fluoride content is low, below 25 ppm. The water-solubility of the final powder, expressed by the Nitrogen Solubility Index (determined according to the American Oil Chemists' Society Official Method Ba 11-65) lies in the range 80 to 100. By virtue of its properties, the protein isolate may be used in a wide range of foods, including sausages, meat replacements, soups, sauces, bouillons, cereals, ice-cream, milk, desserts and the like.

The second of the above-mentioned British applications (23934/72) provides a process for preparing a fish protein isolate containing less than 0.5% by weight of lipids and which is water-soluble at all pH values, in which a slurry comprising comminuted fish material is subjected to enzymatic treatment until less than 20% by weight of the protein present in the fish is precipitable at a pH of 4.5, the slurry is then acidified to a pH of 4.0 to 5.0 and insoluble matter is separated from the slurry to provide a solution of fish protein.

In carrying out the process, the fish material may be first ground, for example in a meat grinder and then further subdivided in a homogeniser, generally without addition of water as most fish materials have a dry matter content rarely higher than about 25% by weight. The comminuted material will normally be obtained as a homogeneous solution, and various known methods exist for achieving this end.

The primary object of the enzymatic treatment step is to solubilise the proteins, without unnecessary degradation, in order to free lipo-proteins and lipids and secure good functional properties in the final protein isolate.

If the starting material is whole raw fish, the enzyme needed for solubilisation is usually present in the viscera. During grinding and homogenisation, the natural enzymes are thoroughly mixed with the flesh and the enzymatic degradation will start immediately. The temperature is preferably maintained between 40° and 70°C in order to obtain rapid dissolution. Depending on the type of fish used, the dissolution time will normally be in the range 15 minutes to 24 hours. If the activity of the natural enzymes is inadequate, various commercially available enzymes active in the pH range of 5.0 to 10.0 may be added.

When eviscerated fish or filleting wastes are used, any commercially available proteolytic enzymes may be added, and it is preferable to use an enzyme active at alkaline pH values, e.g. 8 to 10, because at these pH values, a substantial part of the proteins will be solubilised by alkali added for pH adjustment, and the solubilised proteins will then be more easily attacked by the enzymes, allowing for a rapid solubilisation process. The amount of enzyme to be added generally varies from 0.1 to 10 g per kg of fish dry matter, depending on its activity. The dissolution time is also related to the activity of the enzyme, but will usually be in the range 15 minutes to 24 hours.

The dissolution rate is very rapid at the beginning of the enzyme treatment, slowing down with time because of an inhibitory effect of the dissolved proteins on the enzymes. When 80 to 90% of the proteins have been dissolved the reaction is completely stopped. It is possible to follow the dissolution rate by the following simple test. A graduated test tube is filled to a determined level with the protein solution, concentrated acid is added to bring the pH to 4.5 and the tube is centrifuged for one minute. The amount of solids settled at the bottom of the tube is a direct measure of the amount of undissolved protein. The enzyme treatment is continued until the amount of precipitated protein is less than 20% by weight of the total protein present.

When the enzyme treatment has reached the desired degree of protein solubilisation, the pH of the reaction mixture is adjusted to a value in the range 4.0 to 5.0 by addition of an acid. Any acid of food quality may be used, but it is especially preferred to use hydrochloric acid as it may be easily removed during subsequent steps of the process. The precipitation is an important step in the process, because the precipitated protein absorbs the lipo-proteins and the lipids so that a stable isolate is obtained. About 10 to 20% of the fish protein is generally also precipitated in this step.

The precipitate is then removed, together with undissolved material, by any convenient mechanical procedure. For example, separation may be carried out using vibrating screens, centrifuges or filters. After the separation, a clear protein solution containing 10 to 15% by weight of protein is obtained, and the yield represents 80 to 90% of the fish protein raw material. The separated fraction containing bones, solid proteins, lipoproteins and lipids may be dried or further fractionated by selective centrifuges according to particle size and specific gravity. The various fractions are by-products and may be further treated by known methods.

The protein solution is preferably concentrated, for example by ultrafiltration or by thermal evaporation. Ultrafiltration is the preferred method as besides concentration some desalting and elimination of flavour and odour compounds is obtained. The protein solution may thus be concentrated from 10 to 15% respectively to 30 to 40%. If a thermal evaporator is used, the solution may be concentrated up to about 65% dry weight. The concentrated protein solution has a pH value between 4 and 5 and is stable enough to allow transportation over large distances for final processing. Stability of the solution may, if required, be increased by addition of preservatives which are removed in a subsequent purification step.

If the protein solution contains residual fish flavour or odour it may be deodorised before drying. Various known deodorisation methods are available, including steam-stripping and treatment with active carbon or other adsorbents such as "XAD resin" (Rohm & Haas). Chemicals for deodorisation may also be used, for example hydrogen peroxide which is very effective for oxidising various flavour components and bleaching pigments. Drying of the solution, optionally after concentration, may be carried out by conventional methods, spray-drying being preferred.

The resulting protein isolate is low in lipids (below 0.5% on dry weight) and the ash content is in the range 2 to 10% by weight. The protein content is between 90 and 98% by weight and its molecular weight is between 5,000 and 50,000. The protein is of high nutritional value, at least equal and generally better than casein.

The protein is 100% water-soluble at all pH values. A 3% weight solution in water is clear and slightly yellow in colour. The protein is bland in flavour and can be used for enrichment of a wide range of food products. By virtue of its solubility, it is especially suitable for protein enrichment of acidic beverages, which may be carbonated.

Whey is obtained as a by-product from dairy operations, such as production of cheese. Since the fish protein isolate contains only small amounts of salts, the high salts content in ordinary whey is not a disadvantage, and the whey may be used directly without further modification of the chemical composition. The whey may be used in the form of a dry powder, as a concentrate or in the natural condition as it is obtained in dairy operations. The preferred form will depend upon the physical state of the fish protein isolate.

The protein composition is conveniently prepared, in accordance with the present invention, by forming an aqueous blend the solids content of which comprises 15 to 30% by weight of a fish protein isolate containing at least 90% protein, less than 0.5% lipids and 1 to 10% of minerals, and having a Nitrogen Solubility Index (NSI) of 80 to 100 and 70 to 85% by weight of whey solids, and subjecting the blend to homogenisation at a total pressure of at least 100 kg/cm$^2$. The homogenised blend may be used directly, or it may be dried.

When the fish protein isolate is available as a dry powder, the preferred state of the whey ingredient is as a solution with a dry matter content in the range 6 to 50% by weight. Since preconcentration at the whey production facility, such as a cheese factory, is advantageous considering transportation costs, a dry matter content of 30 to 50% is particularly preferred. Dry fish protein isolate may be added to the liquid whey, together with optional ingredients such as minerals and vitamins. Thereafter the blend is preferably heated to about 60° to 70°C and stirred to ensure complete dissolution of the ingredients.

Normally the pH of the blended material is about 6.6, which is in the preferred range, from the flavour standpoint, of 6.2 to 7.0. Any adjustments may be made with food grade reagents, e.g. sodium or calcium hydroxide, or phosphoric or citric acid. When the ingredients have been dissolved, the solution is homogenised in about 5 minutes, preferably at a total pressure of 100 to 150 kg/cm$^2$. The temperature during homogenisation is preferably about 60° to 70°C, for example 65°C.

Alternatively, if a solution of fish protein isolate is available, it may be mixed with liquid or dried whey, in appropriate proportions to give a total dry matter content having the composition defined previously, and the solution processed as described. In either of the two process variants, the dry matter content of the solution will be selected depending on whether the final product is a powder or a liquid, at for example 10 to 60% solids. For dried products, solutions containing 40 to 60% by weight of dry matter are preferred, as the drying load is reduced, whereas the solids contents of liquid compositions will be a function of their intended uses.

Drying is preferably effected under relatively mild conditions so as not to impair the nutritional and functional properties of the product. Freeze-drying may be used, or spray-drying, preferably at temperatures not exceeding about 80°C (outlet). The dried products preferably have a moisture content not exceeding 7% by weight.

Compositions according to the invention may also be prepared by dry-blending powdered fish protein isolate and whey solids in the specified proportions, with incorporation of optional additives in dry form. Such dry-blended compositions are advantageously agglomerated or granulated to give products with improved reconstitution properties.

The protein composition according to the invention has a bland, sweetish flavour similar to skimmed milk, which it may with advantage replace in various formulations. In liquid form, at the appropriate solids level, it may be used instead of liquid skimmed milk.

The invention is illustrated by the following examples.

EXAMPLE 1

27 kg of dry fish protein isolate (protein: 97%, lipids 0.2%, minerals 2.8%, NSI: 95, moisture 4%) are dispersed in 200 liters of whey concentrated to 3% dry matter. The mixture is heated to 65°C and homogenised at 150 kg/cm$^2$. The mix is then spray-dried, at air inlet and outlet temperatures of 170° and 80°C respectively.

The resulting powder has a moisture content of 5%. Reconstituted with water at a 10% solids level it provides a product which is an excellent substitute for skimmed milk with respect to texture, flavour and functional properties.

EXAMPLE 2

60 kg of dried whey (5% moisture) are dispersed in 100 liters of a 20% solution of fish protein isolate (protein: 91%, lipids: 0.4%, minerals: 8.6%, NSI = 90). The suspension is then homogenised at 150 kg/cm$^2$ and freeze-dried.

The resulting powder has the same properties as the product of Example 1.

EXAMPLE 3

80 kg of whey powder (moisture 5%) and 20 kg of the fish protein isolate used in Example 1 are dry-blended and the blend is agglomerated wih steam.

The resulting agglomerates disperse rapidly in water to provide an excellent substitute for liquid skimmed milk.

EXAMPLE 4

A liquid protein product is prepared as follows: 40 kg of whey powder are dispersed in 100 liters of a 10% solution of fish protein isolate (protein: 97%, lipids: 0.2%, minerals: 2.8%, NSI = 95) and 350 liters of water are added. The mix is then homogenised at 120 kg/cm$^2$, sterilised and canned aseptically.

EXAMPLE 5

1000 kg of whole herring are ground in a meat grinder and then mixed with 1500 kg of isopropanol. The slurry is stirred for 5 minutes at room temperature and the solids are then separated from the isopropanol in a centrifuge. The lipid extraction as described is repeated four further times. This treatment results in 400 kg of extracted fish mass containing 50% dry weight and 50% isopropanol. The solvent used for extraction is recovered by distillation and the fat fraction is separated. The 400 kg of extracted fish are mixed with 1600 kg of water and the slurry is homogenised. The slurry is then continuously mixed with sodium hydroxide to give a pH of 12 and heated to 80°C by steam injection. Immediately after alkali addition and steam injection the slurry is pumped through holding tubes with a residence time of two minutes and thereafter cooled to 50°C. The bones and other insolubles are separated on a vibrating screen and the protein solution is clarified by centrifugation.

The clear protein solution is pumped through a cation exchange resin column in which sodium ions are exchanged by ammonium ions, and 1800 kg solution containing 6.5% dry matter are collected from the column. 20 g of trypsin are added to the solution and the temperature is maintained at 40°C for 30 minutes. 1 kg of 35% hydrogen peroxide is then added and the temperature is raised to 70°C for 30 minutes in order to inactivate the enzyme and to bleach the protein. The bleached solution is pumped into a stripping column, in which each kg of protein solution is contacted countercurrent with 0.5 kg of steam at 100°C, and the stripped solution is cooled to 60°C. The resulting protein solution is bland in flavour, it is concentrated by evaporation to a dry matter content of 40%, and spray-dried to a moisture content of 5.0%. The product has a protein content of 91.8%, and ash content of 8.0, and a lipids content of 0.2%. The fluoride and isopropanol are both below 25 ppm.

EXAMPLE 6

1000 kg of cod filleting waste are ground in a meat grinder and then extracted in a screw extractor with isopropanol. The fish is fed into the lower end of the extractor and the isopropanol into the upper end, providing a countercurrent contact between the fish and the solvent. 1500 kg of isopropanol are used for the extraction of the 1000 kg of fish. The extracted fish mass, containing about 50% dry matter and 50% of isopropanol, continuously leaving the top of the screw is then mixed with water to give a slurry containing 10% dry matter. This slurry is pumped through a homogeniser, potassium hydroxide is added to pH 11.0 and it is heated to 100°C by direct steam injection. The hot alkaline slurry is passed through holding tubes with a residence time of one minute and immediately on leaving the tubes is passed to a decanter centrifuge where the bones and undissolved protein are separated.

The clear protein solution is cooled to 80°C and pumped through a cation exchange resin column in which potassium is exchanged by ammonium. Thereafter the solution is steam-stripped, concentrated in an evaporator to 20% dry matter and spray-dried.

The dried product has a bland flavour and the following composition.

| Protein | 97.0% |
|---------|-------|
| Ash     | 2.6   |
| Lipids  | 0.4   |

EXAMPLE 7

1000 kg of cod filleting wastes are ground in a meat grinder and then further comminuted in a homogeniser. Sodium hydroxide is added to the resulting slurry to give a pH value of 9.0, and 2 kg of a bacterial protease are added and the mixture is heated to 50°C and maintained with stirring for 2 hours. Hydrochloric acid is then added to a pH value of 4.5 and the slurry is continuously heated to 90°C in a tube heat exchanger. After a holding time of 2 minutes the solution is cooled to 30°C and the bones are removed on a vibrating screen. The free fat and the precipitated proteins and lipo-proteins are separated from the dissolved proteins in a centrifuge. The clear protein solution is then concentrated by ultrafiltration from 12 to 30% dry matter.

The concentrated protein solution is deodorised by steam-stripping in a column, where it is contacted for 15 minutes countercurrent to steam at 100°C. 0.5 kg of steam are supplied per kg of solution. The deodorised solution is then concentrated in an evaporator to 65% dry matter and spray-dried.

The spray-dried powder is slightly yellow in colour and bland in flavour. The lipid content is 0.4% and the ash content 8.6%. The balance of 91% is protein of good nutritional value. The PER value is 3.1 compared to 3.0 for casein determined simultaneously.

EXAMPLE 8

1000 kg of whole anchovetas are ground in a meat grinder and then further comminuted in a homogeniser. The homogenised fish mass is heated to 60°C and maintained at this temperature with stirring for 4 hours. A centrifugal test analysis as described above showed that 4 hours reaction time was sufficient to reach a dissolution of about 85% of the proteins. The resulting slurry is then acidified to pH 4.5 with phosphoric acid and the solution is passed through a heat exchanger where it is heated to 90°C for 2 minutes to inactivate all enzymes. It is then cooled to 70°C, insoluble matter is removed in a centrifuge and the solution is passed through a filter in order to remove traces of undissolved proteins, lipo-proteins and free fat. The clear solution, still at 70°C is deodorised by passage through a column of XAD-2 resin (Rohm & Haas), which removes all flavour and colour components. The solution is then concentrated by evaporation to 65% dry matter and spray-dried. The dry material, which is completely soluble at all pH values, has the following composition:

| Protein | 97.0% |
|---------|-------|
| Lipids  | 0.2   |
| Ash     | 2.8   |

EXAMPLE 9

The protein isolate prepared as described in Example 7 is used for the preparation of an acidic beverage. 3.5 kg of the protein are dry-blended with 6.0 kg of sucrose, 0.3 kg of a mixture of citric, malic, phosphoric and ascorbic acids, 0.1 kg of lemon flavour and 0.1 kg of colouring. The blend is granulated, with addition of 10% water, on an inclined pan granulator and dried to a moisture content of 2%. The granulated product is easily wettable and soluble in water. 100 g of the dried beverage powder are reconstituted with 900 g of water to provide a beverage containing above 3% protein, which approximates to the protein content of milk.

EXAMPLE 10

25 kg of resin-deoderised protein solution (10% protein) obtained as described in Example 8 are combined with 25 kg of frozen orange juice concentrate and 50 kg of water. The mixture is pasteurised for 10 seconds at 90°C, cooled to 5°C and bottled. The beverage has a pH of 4.0 and is stable for at least 4 weeks at 5°C. Its flavour is rated by a trained panel of tasters as very similar to regular orange juice.

EXAMPLE 11

15 kg of dried fish protein concentrate are mixed with 200 liters of water to provide a homogeneous slurry. The slurry is then continuously heated to 100°C in a tube heater and 2.5 N sodium hydroxide solution is continuously added to give an alkali concentration of 0.1 N. The slurry is passed through a holding tube with a residence time of 5 minutes and is then cooled to 60°C. After cooling, undissolved material is removed in a clarifying centrifuge. The resulting clear protein solution has a pH value of 12.0 and a dry matter content of 6.7%.

The solution is passed at a rate of 200 liters/ hour through an ion exchange resin column containing 20 liters of Amberlite 200 cation exchange resin, previously regenerated with three bed volumes of 5% ammonium sulphate solution. The protein solution leaving the column has a pH value of 9.8 and contains 6.6% dry matter. The protein solution is then concentrated in an evaporator in a single step to 20% dry weight, with simultaneous elimination of the ammonia present. The concentrated solution, now having a pH value of 7.5, is spray-dried. The ash content of the dry product is 3%.

The resulting dried protein has a NSI value (Nitrogen Solubility Index, as determined by the American Oil Chemists' Society Official Method Ba 11-65) of about 95. For comparison, the NSI value for conventionally processed protein isolate was determined and found to be 75. The protein efficiency ratio (PER) has also been determined on the dried protein and found to be 3.2. Casein tested at the same time showed a value of 3.0.

EXAMPLE 12

250 kg of whole cod are ground in a meat grinder and then mixed with 250 liters of 0.08 N sodium hydroxide. The mixture is heated to 70°C, homogenised in a Fryma mill and maintained at this temperature for 2 hours. Bones and other insoluble matter are then removed and a protein solution containing 10.2% dry matter and having a pH value of 11.0 is recovered.

The protein solution is passed at a rate of 1000 liters/hour through an ion exchange resin column containing 50 liters of Amberlite 200 cation exchange resin regenerated with two bed volumes of 5% ammonium chloride solution. The solution leaving the column contains 9.8% dry matter and has a pH value of 9.3. It is then concentrated and dried as described in Example 11. The ash content of the dry protein is 4.5%.

EXAMPLE 13

20 kg of insoluble lactalbumin are mixed with 200 liters of water to provide a homogeneous slurry. The slurry is then continuously heated to 100°C in a tube heater and sodium hydroxide is continuously added to give an alkali concentration of 0.08 N. The slurry is passed through a holding tube with a residence time of 1 minute, cooled to 60°C and clarified in a centrifuge. The resulting protein solution has a pH value of 11.5 and a dry matter content of 9.2%. The solubilised protein solution is then passed at a rate of 400 liters/ hour through an ion exchange resin column containing 20 liters of Amberlite 200 regenerated with three bed volumes of ammonium carbonate solution. The solution leaving the column contains 9.0% dry matter and has a pH value of 9.5. It is then concentrated and dried as described in Example 11. The dry material has an ash content of 2%.

EXAMPLE 14

20 kg of hexane-extracted soy flour are mixed with 200 liters of 0.03 M solution of calcium hydroxide and agitated for 30 minutes at 55°C. The insoluble matter is removed in a filter press and a clear protein solution containing 8.0% dry matter and having a pH value of 9.5 is recovered.

The protein solution is passed through an ion exchange resin column as described in Example 11. The protein solution leaving the column has a pH value of 9.0 and contains 7.8% dry matter. It is then concentrated by ultrafiltration to separate the low molecular carbohydrates from the proteins, and the concentrated, purified protein solution is spray-dried. The dry material has an ash content of 3%.

EXAMPLE 15

20 kg of dried yeast are mixed with 200 liters of water to provide a homogeneous slurry. The slurry is then continuously heated to 90°C in a tube heater and potassium hydroxide is continuously added to give an alkali concentration of 0.06 N. The slurry is passed through a holding tube with a residence time of 2 minutes, cooled to 50°C and clarified by vacuum filtration. The resulting protein solution has a pH value of 11.5 and a dry matter content of 9.8%.

The protein solution is passed through an ion exchange resin column as described in Example 11. The protein solution leaving the column has a pH value of 9.5 and contains 9.5% dry matter, and it is concentrated by ultrafiltration to separate the low molecular carbohydrates and the degraded nucleic acids from the proteins. The concentrated purified protein solution is then spray-dried. The dry product has an ash content of 1.5%.

What is claimed is:

1. A skimmed milk replacement composition comprising, on a dry solids by weight basis, an admixture of 15 to 30% of a fish protein isolate with 70 to 85% of whey solids, said isolate containing at least 90% protein, less than 0.5% of lipids, of from 1 to 10% of minerals, and having a Nitrogen Solubility Index (NSI) of 80 to 100.

2. A composition according to claim 1 comprising substantially 26% of the fish protein isolate and 74% whey solids.

3. A composition according to claim 1 in which the fish protein isolate and whey solids are agglomerated together.

4. A composition according to claim 2 in liquid form containing 10 to 60% by weight dry solids, the balance to 100% being substantially water.

5. A composition according to claim 4 having a pH of 6.2 to 7.0.

6. A process for preparing a skimmed milk replacement composition which comprises forming an aqueous blend the solids content of which comprises on a dry solids by weight basis 15 to 30% by weight of a fish protein isolate containing at least 90% protein, less than 0.5% lipids and 1 to 10% of minerals, and having a Nitrogen Solubiltiy Index (NSI) of 80 to 100 and 70 to 85% by weight of whey solids, and subjecting the blend to homogenisation at a total pressure of at least 100 kg/cm$^2$.

7. A process according to claim 6 in which the aqueous blend has a solids content of 10 to 60% by weight.

8. A process according to claim 6 in which the aqueous blend has a pH of 6.2 to 7.0.

9. A process according to claim 6 in which after homogenisation the aqueous blend is concentrated to a solids content of 40 to 60% by weight and dried.

10. A process for preparing a skimmed milk replacement composition which comprises agglomerating a substantially dry blend comprising 15 to 30% by weight of a fish protein isolate containing at least 90% protein, less than 0.5% lipids and 1 to 10% of minerals, and having a Nitrogen Solubility Index (NSI) of 80 to 100 and 70 to 85% by weight of whey solids.

11. A process according to claim 10 in which the dry blend comprises substantially 26% by weight of the fish protein isolate and substantially 74% by weight of whey solids.

12. The composition of claim 1 wherein said composition is essentially dry and is powdered form.

* * * * *

UNITED STATES PATENT OFFICE
CERTIFICATE OF CORRECTION

PATENT NO. : 3,978,234
DATED : August 31, 1976
INVENTOR(S) : S.I.W. Bosund and Bengt Lennart Bengtsson It is certified that error appears in the above-identified patent and that said Letters Patent are hereby corrected as shown below:

Col. 4, line 47, "absorbents" should read --adsorbents--.

Col. 7, line 2, after "3%", insert --by--.

Col. 8, line 19, "3%" should read --37%--.

Col. 8, line 43, "wih" should read --with--.

Claim 12, Col. 14, line 10, "is" should read --in--.

Signed and Sealed this

Seventeenth Day of October 1978

[SEAL]

Attest:

RUTH C. MASON
Attesting Officer

DONALD W. BANNER
Commissioner of Patents and Trademarks